United States Patent
Huang

(10) Patent No.: US 7,121,663 B1
(45) Date of Patent: Oct. 17, 2006

(54) EYEGLASSES ASSEMBLY

(75) Inventor: Hung-Ming Huang, Tainan (TW)

(73) Assignee: Paul Chen, San Marino, CA (US)

( * ) Notice: Subject to any disclaimer, the term of this patent is extended or adjusted under 35 U.S.C. 154(b) by 0 days.

(21) Appl. No.: 11/379,305

(22) Filed: Apr. 19, 2006

(51) Int. Cl.
*G02C 5/22* (2006.01)

(52) U.S. Cl. ........................................ 351/153; 16/228

(58) Field of Classification Search ................ 351/153, 351/140, 111, 41; 16/228
See application file for complete search history.

(56) References Cited

U.S. PATENT DOCUMENTS

| | | | |
|---|---|---|---|
| 4,699,479 A * | 10/1987 | Metcalfe | 351/153 |
| 5,418,581 A * | 5/1995 | Conway | 351/116 |
| 5,570,492 A * | 11/1996 | Nakanishi | 16/228 |
| 6,260,965 B1 * | 7/2001 | Kroman et al. | 351/153 |
| 6,942,338 B1 * | 9/2005 | Ku | 351/153 |

* cited by examiner

*Primary Examiner*—Hung Xuan Dang
(74) *Attorney, Agent, or Firm*—Ladas & Parry LLP

(57) ABSTRACT

An eyeglasses assembly includes a lens frame and two eyeglass temples. The lens frame have two mounting seats provided at left and right ends, respectively. Each mounting seat has a pivot hole. Each eyeglass temple includes a coupling portion mounted pivotally to a respective one of the mounting seats. The coupling portion includes two resilient legs, and a curved pivot part disposed between the resilient legs and extending pivotally through the pivot hole in the respective one of the mounting seats. The resilient legs abut against outer faces of the mounting seats when the eyeglass temples are unfolded, and bias the curved pivot parts to move inward and limit outward movements of the eyeglass temples.

11 Claims, 9 Drawing Sheets

EYEGLASSES ASSEMBLY

BACKGROUND OF THE INVENTION

1. Field of the Invention

The invention relates to an eyeglasses assembly, more particularly to an eyeglasses assembly with eyeglass temples that are mounted pivotally to a lens frame.

2. Description of the Related Art

A conventional eyeglasses assembly is usually designed with a lens frame surrounding a pair of eyeglass lenses or a single eyeglass lens, and a pair of eyeglass temples extending rearwardly from two sides of the lens frame. Mounting of the eyeglass temples to the sides of the lens frame is conventionally done via screw fasteners. At present, manufacturers have developed several ways for mounting the eyeglass temples to the lens frame by using special structures and configurations without utilizing screw fasteners. These structures and configurations are specifically designed to suit various requirements so as to enable consumers to make their selections based on their needs.

It should be noted that the eyeglass temples normally overlap each other when stowed away, and are provided away from each other when in use for a maximum distance that is equal to the length of the lens frame. However, since the length of the lens frame is fixed after fabrication, when applied to a person having a face that is wider than the length of the lens frame, not only is the eyeglasses assembly subject to unrecoverable deformation, but the face of the eyeglass wearer is also squeezed uncomfortably by the eyeglass temples. Therefore, a kind of eyeglasses assembly having an elastic mechanism has been developed to improve upon the aforementioned shortcoming.

As shown in FIG. 1 and FIG. 2, a conventional eyeglasses assembly 5 includes a lens frame 51, a pair of eyeglass temples 52 (only one is shown), and a pair of elastic coupling mechanism 53 (only one is shown) for connecting respectively the eyeglass temples 52 to the lens frame 51. Each of the eyeglass temples 52 includes a front end 521. Each of the elastic coupling mechanisms 53 includes a coupling member 531, an abutting member 533, an elastic spring 534, and a stop 535. The coupling member 531 is mounted to one end of the lens frame 51, extends rearwardly from the lens frame 51, is coupled to a corresponding one of the eyeglass temples 52, and is formed with a mounting hole 532. The abutting member 533, the elastic spring 534, and the stop 535 are sequentially disposed in the mounting hole 532.

As shown in FIG. 2, when the conventional eyeglasses assembly 5 is in a normal-use position, the elastic spring 534 provides a constant urging force that pushes the abutting member 533 to extend out of the mounting hole 532 such that the abutting member 533 urges against the front end 521 of the corresponding one of the eyeglass temples 52. As shown in FIG. 3, the conventional eyeglasses assembly 5 is in an expanded position when an external force is exerted on the eyeglass temples 52 so as to pivot the eyeglass temples 52 outwardly to form a distance between each other that is longer than the length of the lens frame 51. In the expanded position, the front ends 521 of the eyeglass temples 52 push respectively and inwardly the abutting members 533 such that an elastic restoring force is stored in the elastic spring 534. As the external force is released to move the conventional eyeglasses assembly 5 from the expanded position back to the normal-use position, the abutting member 533 of each of the elastic mechanisms 53 moves outwardly relative to the mounting hole 532 by virtue of the urging action of the elastic spring 534.

Although the conventional eyeglasses assembly 5 prevents components thereof from unrecoverable deformation, its structure is complicated and its manufacturing cost is relatively high, making it a non-ideal design.

SUMMARY OF THE INVENTION

Therefore, the object of the present invention is to provide an eyeglasses assembly whose eyeglass temples are capable of being expanded beyond the length of a lens frame thereof, and whose structure is simpler as compared to the prior art.

According to the present invention, there is provided an eyeglasses assembly that includes a lens frame and two eyeglass temples. The lens frame has left and right ends, and two mounting seats provided at the left and right ends, respectively. Each of the mounting seats has a pivot hole. Each of the eyeglass temples includes a coupling portion mounted pivotally to a respective one of the mounting seats. The coupling portion includes two resilient legs, and a curved pivot part disposed between the resilient legs and extending pivotally through the pivot hole in the respective one of the mounting seats. The resilient legs respectively abut against outer faces of the mounting seats when the eyeglass temples are unfolded, and bias the curved pivot parts to move inward and limit outward movements of the eyeglass temples.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
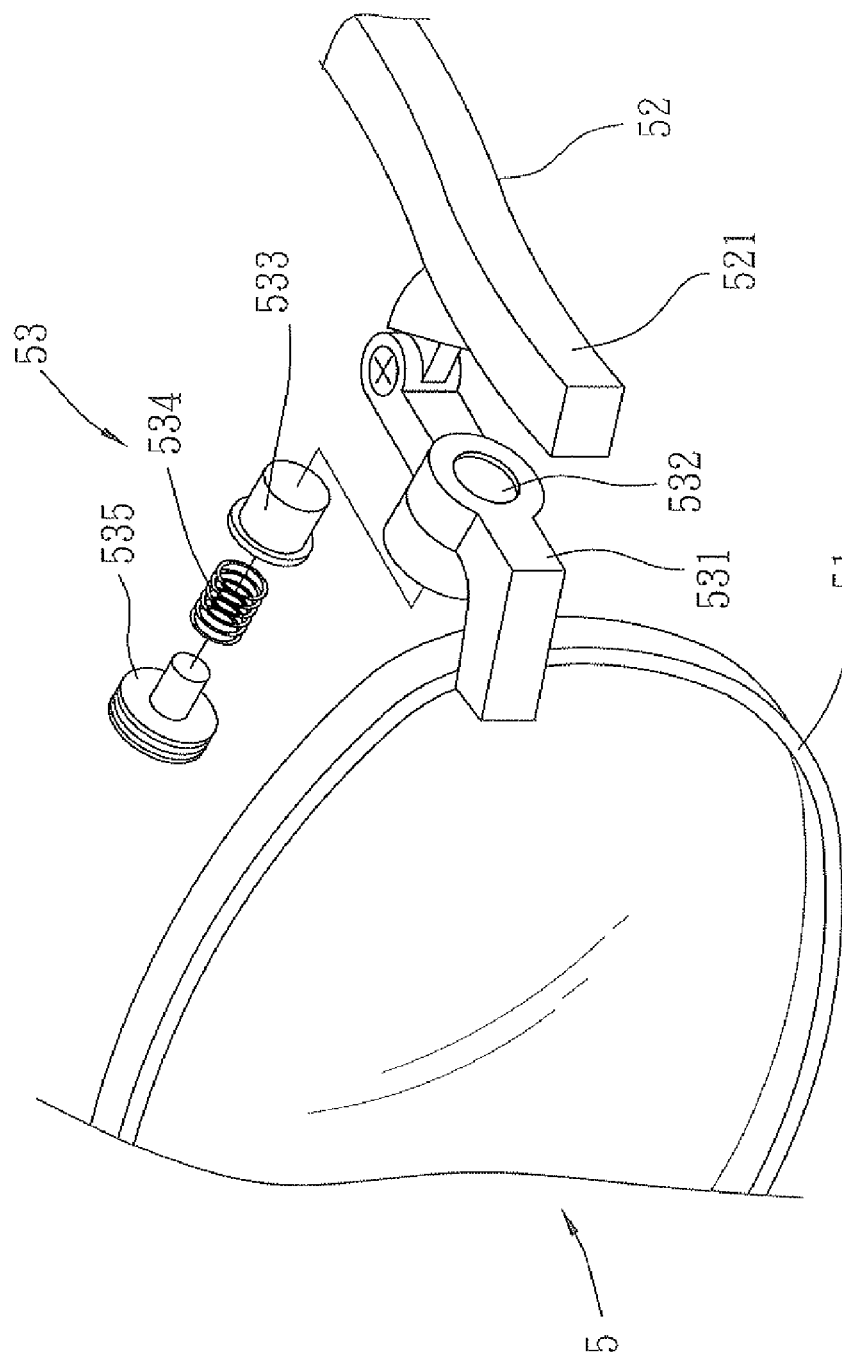
FIG. 1 is a fragmentary exploded perspective view of a conventional eyeglasses assembly.
Figure 2:
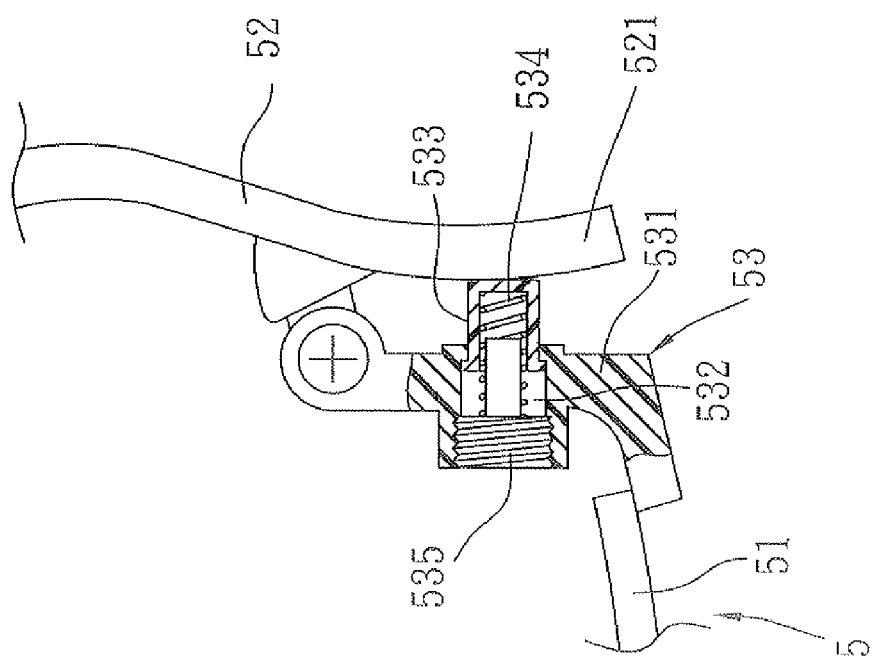
FIG. 2 is a fragmentary assembled sectional view of the conventional eyeglasses assembly, illustrating a normal-use state.
Figure 3:
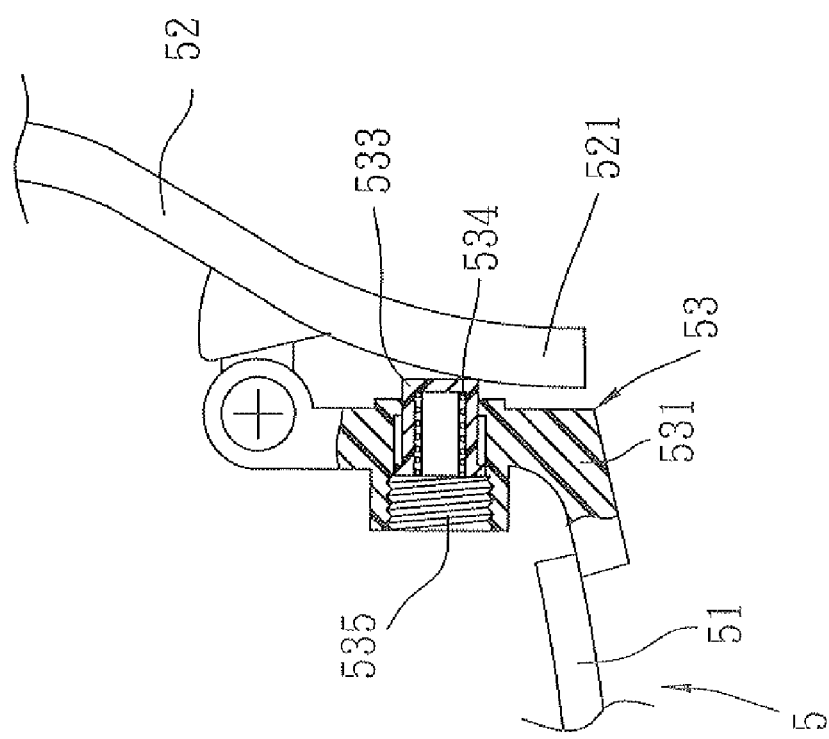
FIG. 3 is a fragmentary assembled sectional view similar to FIG. 2, illustrating an expanded state.
Figure 4:
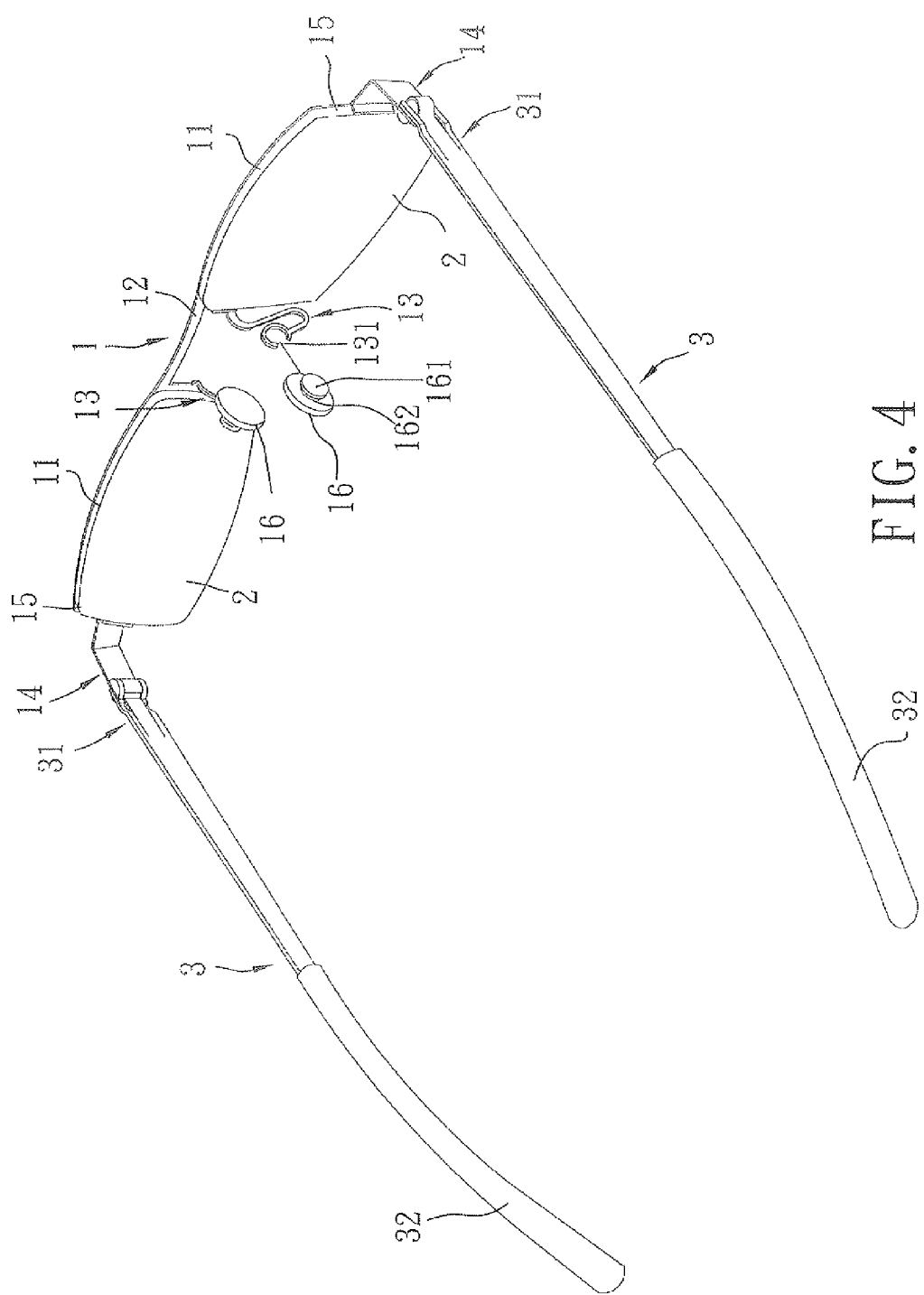
FIG. 4 is a perspective view of the preferred embodiment of an eyeglasses assembly according to the present invention.
Figure 5:
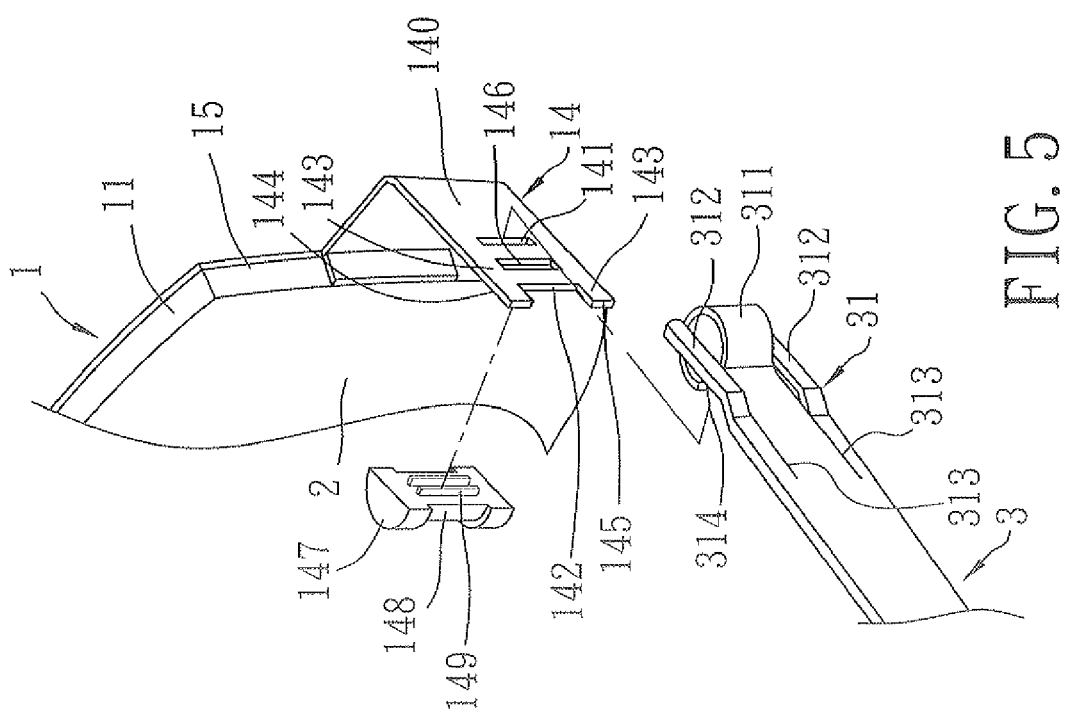
FIG. 5 is a fragmentary exploded perspective view of the preferred embodiment, illustrating the relationship between a lens frame and an eyeglass temple.
Figure 6:
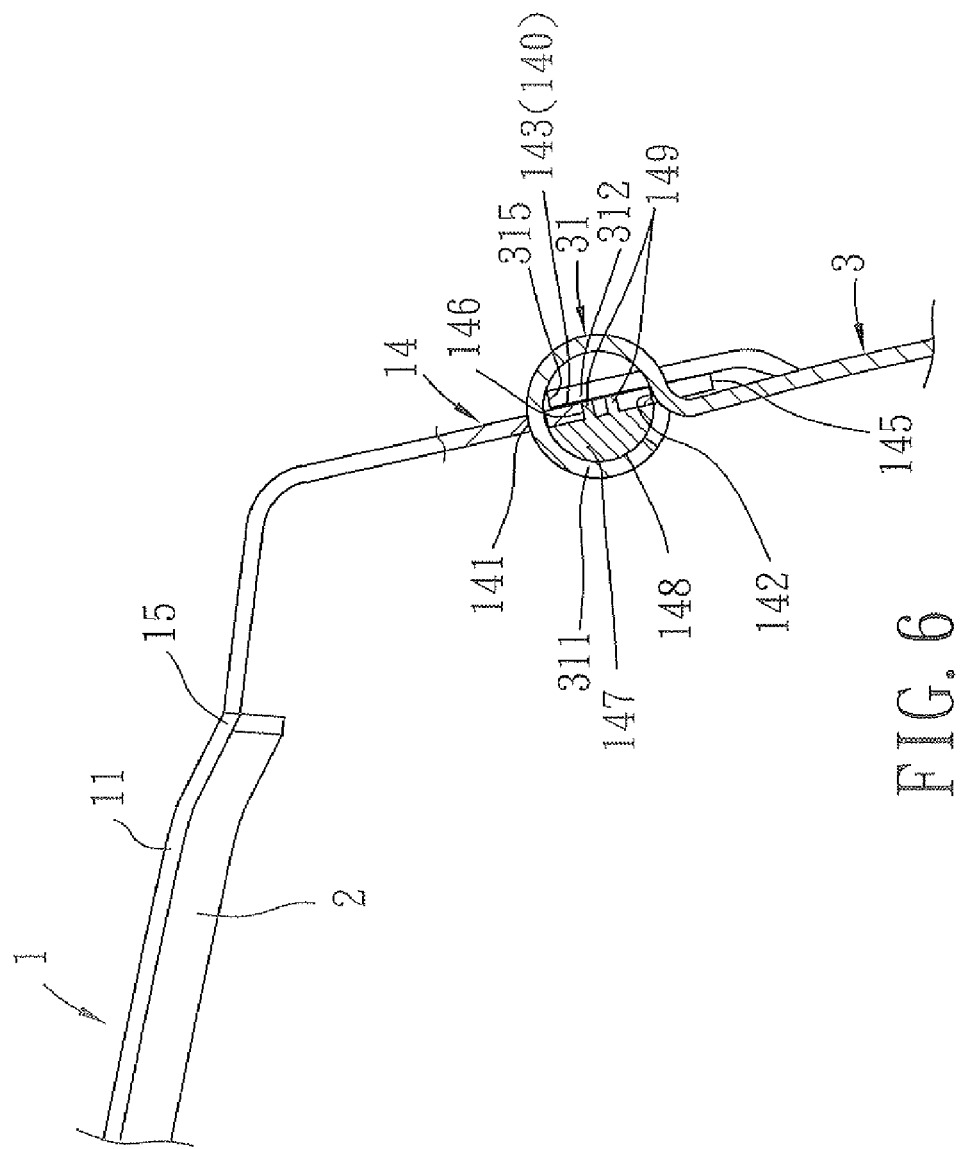
FIG. 6 is a fragmentary sectional view of the preferred embodiment, illustrating the eyeglass temple in an unfolded position.

As shown in FIG. 4, FIG. 5 and FIG. 6, the preferred embodiment of an eyeglasses assembly according to the present invention includes a lens frame 1, two lenses 2, and a pair of eyeglass temples 3.

The lens frame 1 is formed integrally by stamping a metal sheet, and has left and right ends 15. The lens frame 1 has two frame portions 11 respectively disposed proximate to the left and right ends 15, a bridge 12 interconnecting the frame portions 11, a pair of nose pads 16, and a pair of pad holding arms 13 provided on the frame portions 11 and disposed proximate to the bridge 12. Each nose pad 16 has a stud 161 projecting therefrom and constricted at a neck 162 thereof. Each of the pad holding arms 13 has a substantially C-shaped hook 131 for holding a respective one of the nose pads 16 by engaging the neck 162. In this embodiment, the nose pads 16 are made from a flexible rubber, such as silicone, or a plastic material.

The lens frame 1 further has two mounting seats 14 provided at the left and right ends 15, respectively. Each of the mounting seats 14 has a pivot hole 141, a termination edge 145 formed with a notch 142 that is spaced apart from the pivot hole 141, and an inner face 144 provided with a guide member 147 projecting inwardly between the notch 142 and the pivot hole 141. The guide member 147 is formed with a curved slide groove 148.

While the guide member 147 may be formed integrally with the corresponding mounting seat 14, the guide member 147 is a separate piece in this embodiment. Each of the mounting seats 14 further has an engaging hole 146 between the notch 142 and the pivot hole 141. The guide member 147 has an engaging peg 149 engaging the engaging hole 146 so that the guide member 147 is mounted to the respective one of the mounting seats 14. In particular, the engaging pegs 149 is bifurcated to be engaged in the engaging hole 146. It should be noted herein that mounting of the guide member 147 to the respective one of the mounting seats 14 is not limited to the specific means disclosed herein. For example, the guide member 147 may be soldered to the respective one of the mounting seats 14.

As shown in FIG. 4, the lenses 2 are disposed between the left and right ends 15 of the lens frame 1, and are mounted respectively to the frame portions 11 in a known manner. Since the feature of the present invention does not reside in the mounting of the lenses 2, further details of the same are omitted for the sake of brevity. It should also be noted herein that a single-piece lens may be used in place of the two lenses 2 in other embodiments of the present invention.

Referring back to FIGS. 4 to 6, each of the eyeglass temples 3 is formed integrally by punching a metal sheet, and includes a coupling portion 31 and an earpiece 32 connected to the coupling portion 31 to facilitate wearing by a user. The coupling portion 31 is mounted pivotally to a respective one of the mounting seats 14 of the lens frame 1. The coupling portion 31 includes two resilient legs 312, and a curved pivot part 311 disposed between the resilient legs 312 and extending pivotally through the pivot hole 141 in the respective one of the mounting seats 14.

Figure 9:
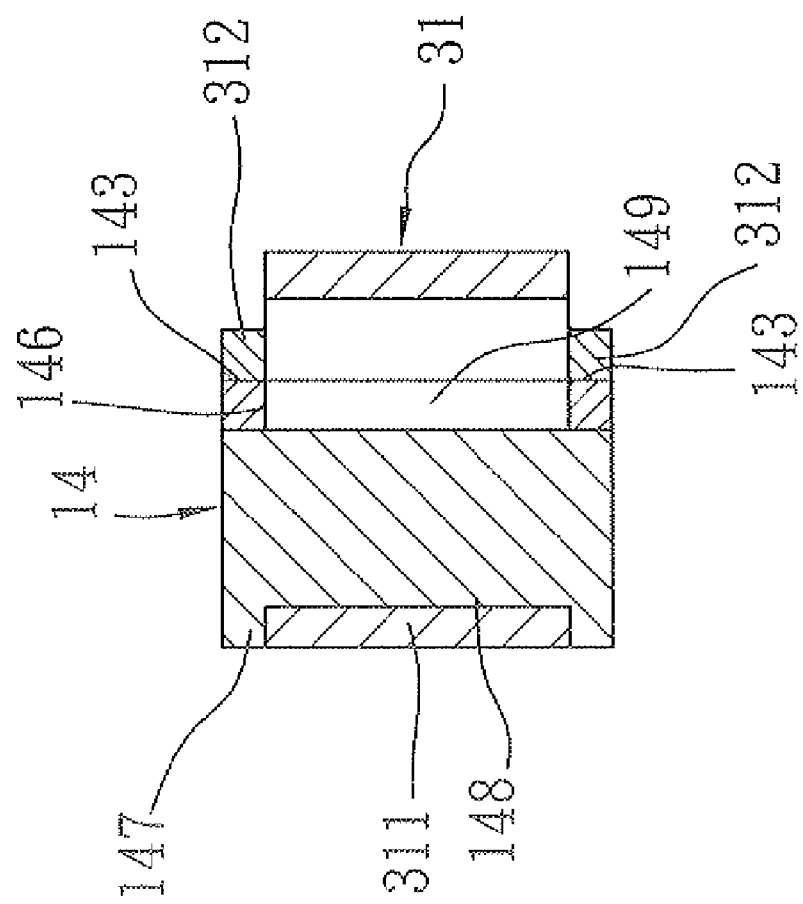
FIG. 9 is a fragmentary sectional view of the preferred embodiment, where the eyeglass temple is in the unfolded position.

In this embodiment, the coupling portion 31 is formed with two longitudinal slits 313, each of which extends between the curved pivot part 311 and one of the resilient legs 312. The curved pivot part 311 is configured as a substantially C-shaped ring 311 that bends outwardly and forwardly and then extends inwardly from an outer face 140 of the respective one of the mounting seats 14 through the pivot pin 141, and that has an opening 314 disposed inwardly of the outer face 140. In particular, the C-shaped ring 311 passes through the notch 142 and the pivot hole 141, and extends into the curved slide groove 148 in the guide member 147. When the C-shaped ring 311 pivots relative to the respective one of the mounting seats 14, it slides along the curved slide groove 148, as best illustrated in FIG. 6 and FIG. 9. It should be noted herein that as an alternative, the curved pivot part 311 may be a C-shaped ring 311 having its opening 314 disposed outside or at the outer face 140 of the respective one of the mounting seats 14. With the opening 314 of the C-shaped ring 311 disposed outside, the guide member 147 should then project outwardly from the outer face 140, instead of from the inner face 144.

In this embodiment, the C-shaped ring 311 is circular. The guide member 147 has a semi-circular cross section, and the curved slide groove 148 extends circumferentially of the guide member 147 and coaxially with the C-shaped ring 311.

As shown in FIG. 5 and FIG. 6, when the eyeglass temples 3 are unfolded, the resilient legs 312 of the coupling portion 31 of each of the eyeglass temples 3 respectively extend over and abut against portions 143 of the outer face 140 of the respective one of the mounting seats 14 on two sides of the notch 142.

Figure 7:
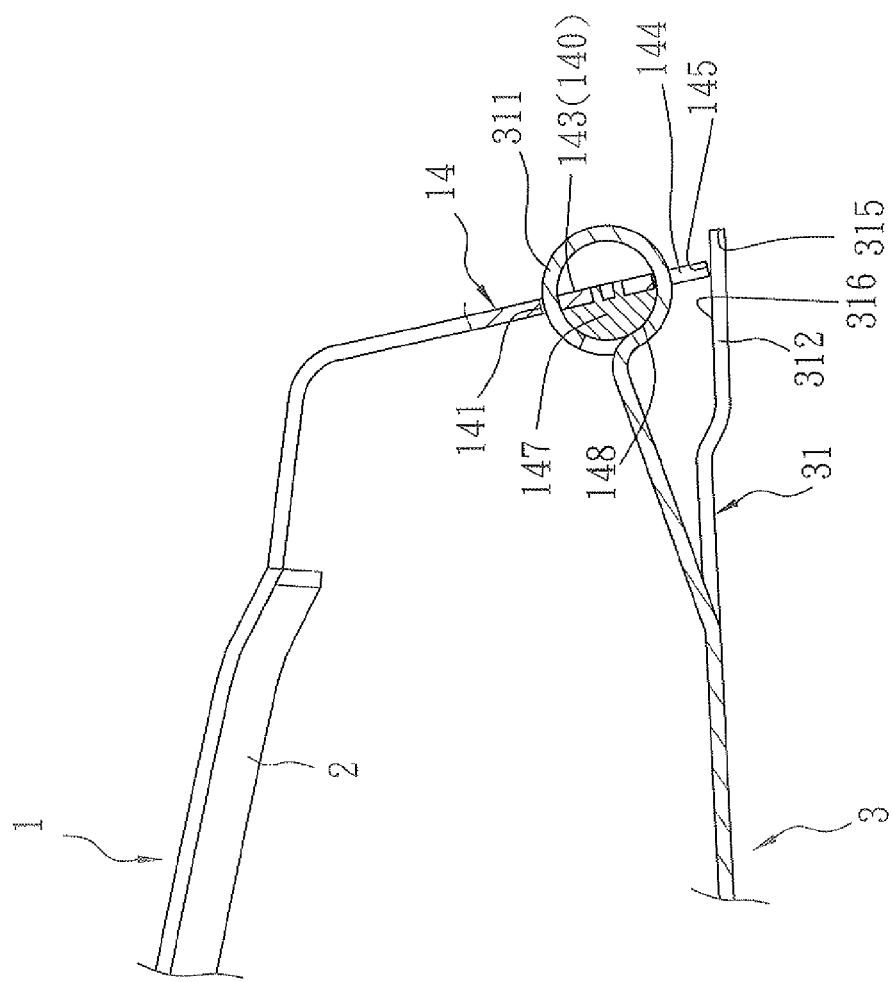
FIG. 7 is a fragmentary sectional view similar to FIG. 6, illustrating the eyeglass temple in a folded position.
Figure 8:
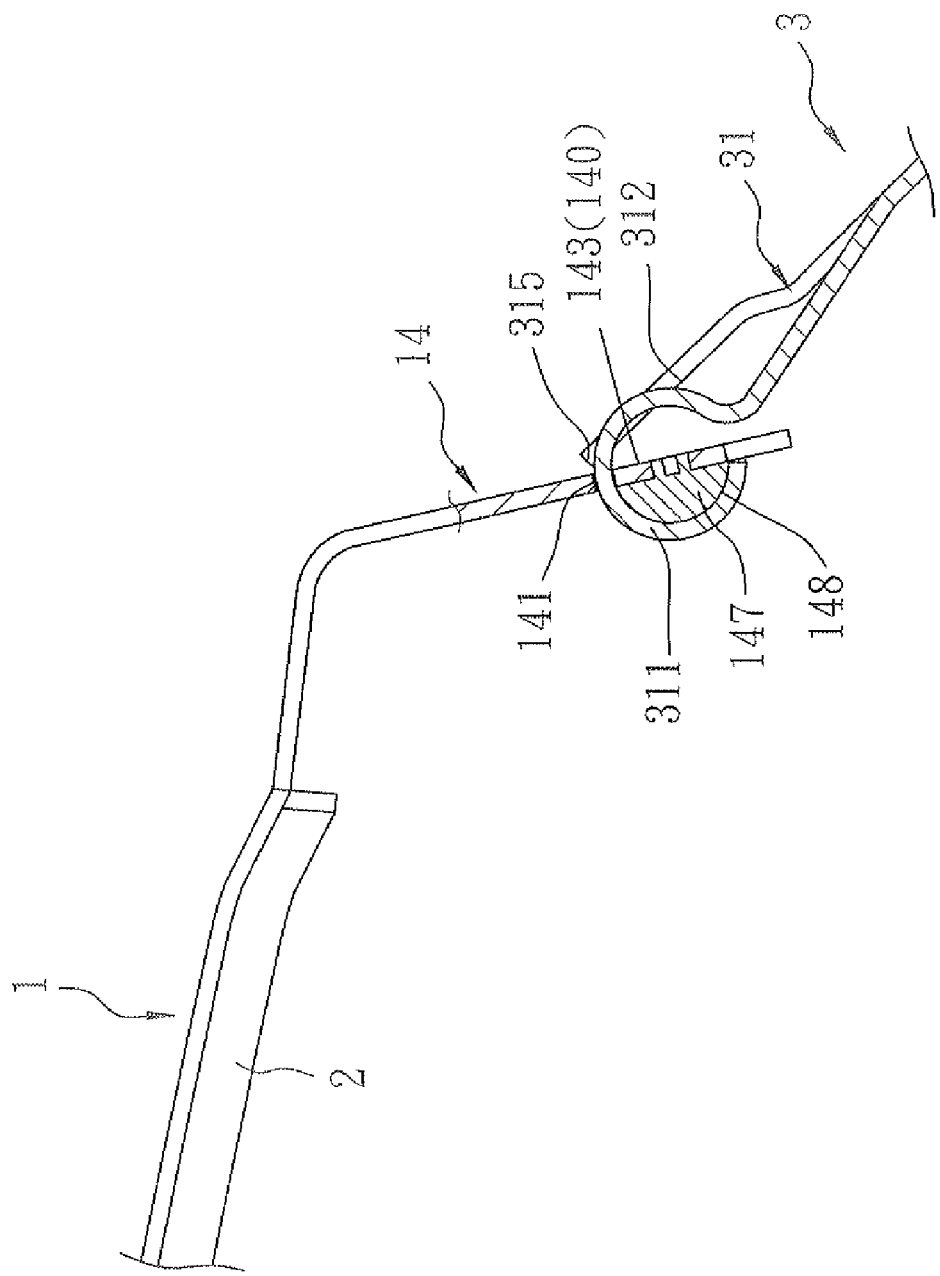
FIG. 8 is a fragmentary sectional view similar to FIG. 6, illustrating the eyeglass temple in an expanded position.

To move the eyeglass temples 3 from the unfolded position, as illustrated in FIG. 6, to a folded position, as illustrated in FIG. 7, an external force is exerted inwardly on each of the eyeglass temples 3 such that the curved pivot part 311 of the coupling portion 31 slides along the curved slide groove 148. The external force is exerted until an inner surface 316 of each resilient leg 312 proximate to a free end 315 of the resilient leg 312 urges against the termination edge 145 of the respective one of the mounting seats 14. To move the eyeglass temples 3 from the folded position (shown in FIG. 7) back to the unfolded position (shown in FIG. 6), an external force is exerted outwardly on each of the eyeglass temples 3. The C-shaped ring 311 is therefore turned outward, and the resilient legs 312 abut against the outer face 140 of the respective mounting seat 14. In this situation, due to the elastic force in the resilient legs 312, the C-shaped ring 311 is biased to move inward so that the eyeglass temple 3 is limited from moving or turning outward. Even when the eyeglass temples 3 are pushed outward from the position shown in FIG. 6 to a position shown in FIG. 8, once the external force is released, the eyeglass temples 3 can be returned inwardly by the elastic force in the resilient legs 312.

Therefore, the eyeglass temples 3 of the eyeglasses assembly according to the present invention may be turned outward to expand the width therebetween so that the eyeglasses assembly is suitable for wearing by a user with a broad face. In addition, since the eyeglasses assembly does not require the use of screw fasteners in mounting the eyeglass temples 3 to the lens frame 1, the eyeglasses assembly is simple in structure and is easy to assemble.

It should be noted herein that due to the presence of the curved slide groove 148 in the guide member 147 of the mounting seat 14, the curved pivot part 311 of the coupling portion 31 is spatially limited therein and is prevented from wobbling during movement of the respective eyeglass temple 3.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An eyeglasses assembly comprises:
   a lens frame having left and right ends, and two mounting seats provided at said left and right ends, respectively, each of said mounting seats having a pivot hole; and two eyeglass temples, each including a coupling portion mounted pivotally to a respective one of said mounting seats, said coupling portion including two resilient legs, and a curved pivot part disposed between said resilient legs and extending pivotally through said pivot hole in the respective one of said mounting seats, said resilient legs abutting against outer faces of said mounting seats when said eyeglass temples are unfolded, and biasing said curved pivot parts of said eyeglass temples to move inward and limiting outward movements of said eyeglass temples.

2. The eyeglasses assembly as claimed in claim 1, wherein said coupling portion of each of said eyeglass temples is formed with two longitudinal slits, each extending between said curved pivot part and one of said resilient legs.

3. The eyeglasses assembly as claimed in claim 2, wherein said curved pivot part of said coupling portion of each of said eyeglass temples is configured as a substantially C shaped ring.

4. The eyeglasses assembly as claimed in claim 3, wherein said C-shaped ring bends outwardly and forwardly and then extends inwardly from said outer face of the respective one of said mounting seats through said pivot hole, and has an opening disposed inwardly of said outer face of the respective one of said mounting seats.

5. The eyeglasses assembly as claimed in claim 4, wherein each of said mounting seats has a termination edge formed with a notch that is spaced apart from said pivot hole, said C-shaped ring passing through said notch and said pivot hole.

6. The eyeglasses assembly as claimed in claim 5, wherein said resilient legs of said coupling portion respectively extend over and abut against portions of said outer face of the respective one of said mounting seats on two sides of said notch when a respective one of said eyeglass temples is unfolded.

7. The eyeglasses assembly as claimed in claim 6, wherein each of said mounting seats has an inner face provided with a guide member projecting inwardly between said notch and said pivot hole, said guide member having a curved slide groove, said C-shaped ring extending into and being slidable along said curved slide groove.

8. The eyeglasses assembly as claimed in claim 7, wherein said C-shaped ring is circular, the cross-section of said guide member being semi-circular, said curved slide groove extending circumferentially of said guide member and coaxially with said C shaped ring.

9. The eyeglasses assembly as claimed in claim 7, wherein each of said mounting seats further has an engaging hole between said notch and said pivot hole, said guide member having an engaging peg engaging said engaging hole so that said guide member is mounted to the respective one of said mounting seats.

10. The eyeglasses assembly as claimed in claim 9, wherein said engaging peg is bifurcated.

11. The eyeglasses assembly as claimed in claim 1, wherein said lens frame further includes a pair of nose pads, and a pair of pad holding arms holding said nose pads, respectively, each of said nose pads having a stud projecting therefrom and formed with a neck, each of said pad holding arms having a substantially C-shaped hook engaging said neck of the respective one of said nose pads.

* * * * *